April 24, 1956 — J. NIEDERHAUSER — 2,742,798
MARINE PROPULSION PLANT
Filed Sept. 21, 1954
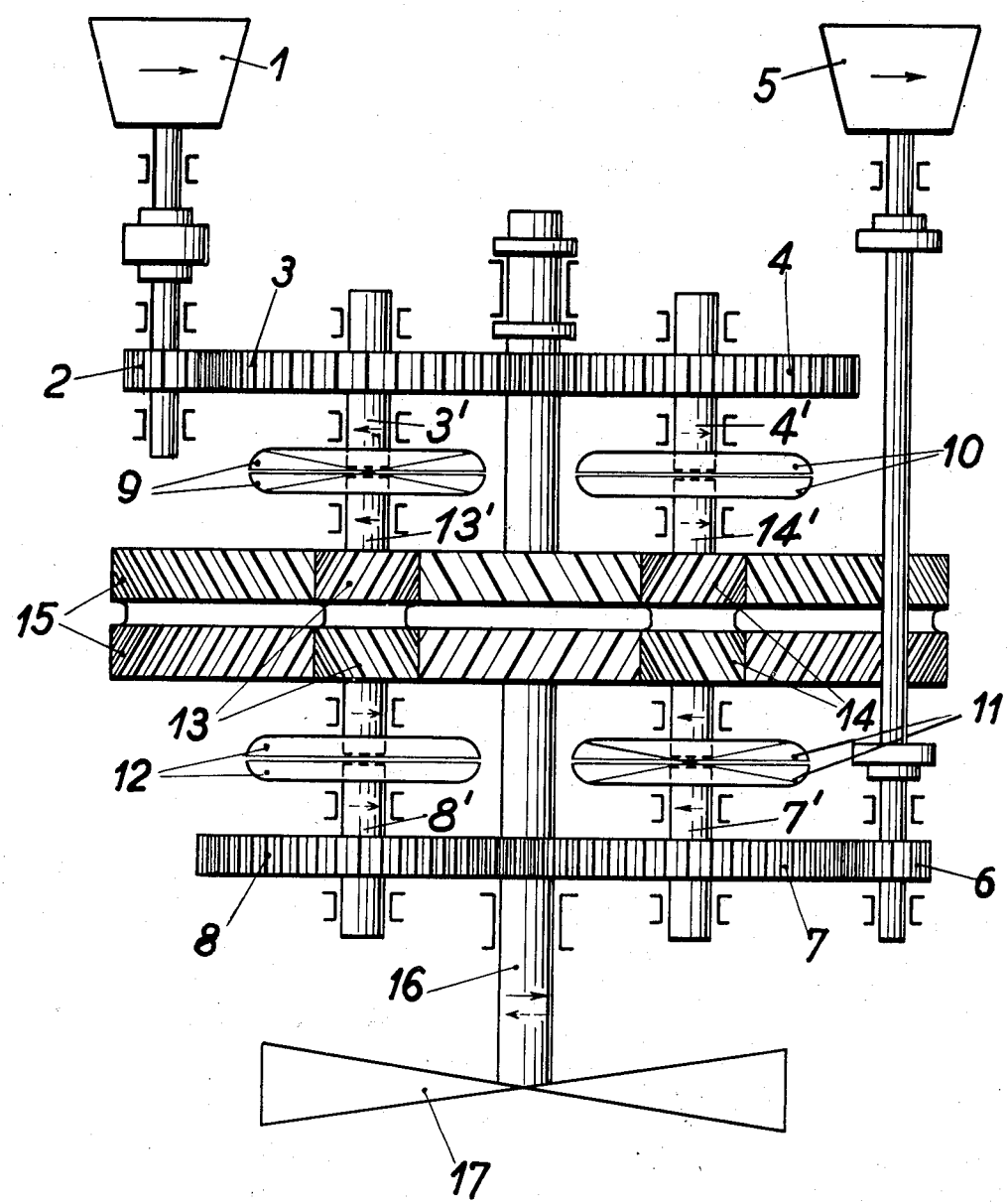
Inventor
Jakob Niederhauser
By Pierce, Scheffler & Parker
Attorneys & 2,742,798
Patented Apr. 24, 1956

2,742,798
MARINE PROPULSION PLANT

Jakob Niederhauser, Wettingen, Switzerland, assignor to Aktiengesellschaft Brown, Boveri & Cie, Baden, Switzerland, a joint-stock company Application September 21, 1954, Serial No. 457,439

Claims priority, application Switzerland September 26, 1953

2 Claims. (Cl. 74—665)

This invention relates to marine propulsion plants and more particularly to marine propulsion plants which include two prime movers.

In marine propulsion installations with two driving engines operating in only one sense of rotation it is known to drive the propeller shaft over a switchable synchronizing and reversing gear. These gears are usually designed to reduce the speed of the propeller with regard to that of the driving engines and are provided with intermediate gear wheels and clutches, usually of fluid type, which serve to change the direction of the propeller driven by the two driving engines for forward or reverse motion.

In these conventional installations gear wheels and clutches are provided for each sense of rotation, that is, double, and when the installation operates in one sense or the other, one part of the gear wheels always rotates idly. This is unfavorable since the idly running gear wheels tend to vibrate when the speed varies. Besides, many gear wheels and bearings are required which makes such an installation heavy and expensive. Finally, the idly running shafts and wheels also result in high power losses.

Objects of the present invention are to provide marine propulsion plants of the two engine type which avoid the disadvantages of the prior installations. More specifically, an object is to provide a marine propulsion plant which includes two driving engines which each rotate in only one direction, a first gear stage driven by each engine and including a reversing gear in mesh with a synchronizing gear, a second gear stage comprising a large gear wheel on the propeller shaft and a pair of drive pinions in mesh therewith and clutches for selectively coupling each drive pinion to the reversing gear of one first gear stage and to the synchronizing gear of the other first gear stage.

These and other objects and the advantages of the invention will be apparent from the following specification when taken with the accompanying drawing in which the single view is a schematic plan view of a marine propulsion plant embodying the invention.

Reference numeral 1 identifies a driving engine, for example a gas turbine, which can rotate in only one direction and which, through pinion 2, drives a gear stage comprising gear wheels 3, 4 of equal diameter on shafts 3' and 4', respectively. For convenience of description, gear wheel 3 will be termed a reversing gear wheel since its shaft 3' rotates in the sense opposite that of turbine 1, as shown by the solid line arrows, and gear wheel 4 will be termed a synchronizing gear. A second prime mover 5 which is also a gas turbine rotatable only in the same direction as turbine 1 drives through pinion 6 a gear stage identical with that of the first prime mover and comprising reversing gear wheel 7 on shaft 7' and meshing with synchronizing gear wheel 8 on shaft 8'. Sections of clutches or hydraulic couplings 9, 10, 11 and 12 are mounted on the shafts 3', 4', 7' and 8' for the selective drive of small pinions 13, 14 which mesh with large gear wheel 15 on shaft 16 which carries the propeller 17. Shafts 3' and 4' are parallel to each other and to the propeller shaft 16, with the shaft 13' of pinion 13 between and axially alined with shafts 3' and 8', the shaft 13' carrying the cooperating sections of hydraulic clutches 9 and 12. Similarly shaft 14' of pinion 14 is axially alined with and between shafts 4' and 7', and carries the cooperating sections of hydraulic clutches 10 and 11. The second stages of the gearing for the prime movers, i. e. pinions 13, 14, respectively, and the large gear wheel 15, are constructed like the respective first stages to provide a large step down transmission ratio for a drive of the propeller shaft at a much smaller speed than that of the turbines 1 and 5.

The first gear stages of the two engines 1 and 5 are longitudinally spaced and at opposite sides of the large gear wheel 15, and the shafts 13' and 14' of the respective second gear stages are symmetrically arranged laterally of the propeller shaft 16. Only one clutch of each small pinion shaft 13' and 14' is engaged at any one time, for example clutches 9 and 11 as indicated schematically in the drawing by the crossed lines. Under this condition, the propeller shaft turns in the same sense as the turbines, as indicated by the solid line arrows, since reversing gears 3 and 7 turn in the sense opposite that of turbines 1 and 5, and a further reversal obtains as pinions 13 and 14 drive the large gear wheel 15 on propeller shaft 16. To reverse the direction of travel, clutches 9 and 11 are disengaged, and clutches 10 and 12 are engaged, whereupon the several shafts turn in the sense indicated by the broken line arrows.

The described arrangement employs less gear wheels and bearings than the known systems and the small pinions 13, 14 which mesh with the large gear wheel 15 are driving elements for both directions of travel so that they are always fully utilized, thus eliminating some of the shafts, bearings and lubricating devices employed in the prior marine propulsion plants.

I claim:

1. A marine propulsion plant comprising two driving engines which each rotate in only one direction, a first gear stage driven by each engine and including a pair of meshing gear wheels of the same diameter, a propeller shaft having thereon a large gear positioned between the respective first gear stages, shafts carrying the gear wheels of the respective first gear stages, said gear wheel shafts being longitudinally spaced and axially alined in pairs located laterally of said propeller shaft, second gear stages for each engine comprising small pinions meshing with said large gear of the propeller shaft and on drive shafts axially alined with and located between the gear wheel shafts of the respective pairs, and clutches for selectively coupling the drive shafts to gear wheel shafts of the first stages which rotate in the same sense.

2. A marine propulsion plant as recited in claim 1, wherein both engines rotate in the same sense, each first gear stage comprises a reversing gear wheel driven by its associated engine through a pinion and meshing with a synchronizing gear wheel, and the shaft carrying the reversing gear wheel of each first gear stage is axially alined with the shaft carrying the synchronizing gear wheel of the other first gear stage.

References Cited in the file of this patent

UNITED STATES PATENTS

| | | |
|---|---|---|
| 2,305,373 | Adamson | Dec. 15, 1942 |
| 2,535,904 | Davis | Dec. 26, 1950 |
| 2,568,275 | Dahlstrand et al. | Sept. 18, 1951 |
| 2,661,633 | Suberkrub | Dec. 8, 1953 |

FOREIGN PATENTS

| | | |
|---|---|---|
| 62,482 | Norway | May 20, 1940 |
| 426,879 | Italy | Nov. 8, 1947 |